United States Patent [19]
Hasegawa et al.

[11] Patent Number: 5,523,844
[45] Date of Patent: Jun. 4, 1996

[54] DISPLACEMENT DETECTION APPARATUS

[75] Inventors: Masanobu Hasegawa, Fujisawa; Minoru Yoshii, Tokyo; Noriaki Ohguri, Zama; Masayoshi Sekine, Tokyo; Seiji Mishima, Atsugi, all of Japan

[73] Assignee: Canon Kabushiki Kaisha, Tokyo, Japan

[21] Appl. No.: 90,315

[22] Filed: Jul. 13, 1993

[30]    Foreign Application Priority Data

Jul. 24, 1992 [JP] Japan ................. 4-218172

[51] Int. Cl.⁶ ........................... G01B 11/14
[52] U.S. Cl. .................. 356/373; 356/375; 385/14
[58] Field of Search ................... 356/372, 356, 356/373, 358, 375, 376, 399, 400, 4, 152, 150, 153; 250/560, 561; 385/8, 14, 33, 93

[56]           References Cited

U.S. PATENT DOCUMENTS

| | | | |
|---|---|---|---|
| 4,198,164 | 4/1980 | Cantor | 356/375 |
| 4,577,101 | 3/1986 | Bremer et al. | 250/231 SE |
| 4,746,792 | 5/1988 | Dil | 356/373 |
| 4,760,568 | 7/1988 | Hine | 385/14 |
| 4,843,237 | 6/1989 | Michel | 356/373 |
| 4,897,536 | 1/1990 | Miyoshi | 250/561 |
| 4,955,718 | 9/1990 | Michel | 356/356 |
| 4,979,788 | 12/1990 | Brazas, Jr. | 385/14 |
| 5,100,220 | 3/1992 | Voegeli | 385/14 |
| 5,247,493 | 9/1993 | Kime et al. | 356/375 |

*Primary Examiner*—Hoa Q. Pham
*Attorney, Agent, or Firm*—Fitzpatrick, Cella, Harper & Scinto

[57]            ABSTRACT

An apparatus for detecting a displacement of an object comprises a light source element for emitting a detection light beam, a reflection member for reflecting the detection light beam from the light source element, the detection light beam being irradiated to the object by the reflection by the reflection member, a photo-sensing element for sensing the detection light beam reflected from the object by a photo-sensing plane thereof to detect an incident position of the detection light beam on the photo-sensing plane, displacement information of the object being determined in accordance with the detection by the photo-sensing element, and a substrate having the light source element, the reflection member and the photo-sensing element arranged thereon.

18 Claims, 6 Drawing Sheets

FIG. 6
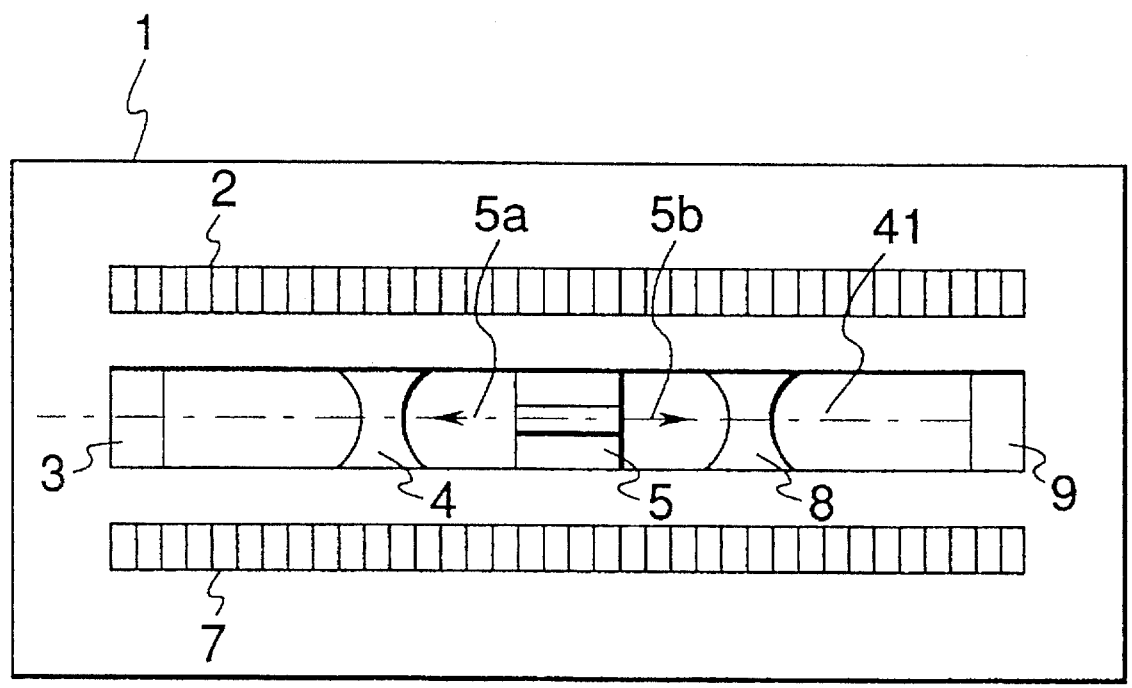
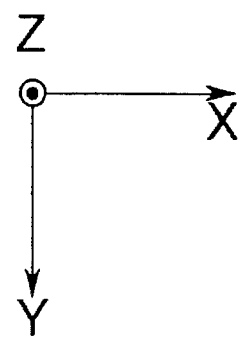

DISPLACEMENT DETECTION APPARATUS

BACKGROUND OF THE INVENTION

1. Field of the Invention

The present invention relates to a displacement detection apparatus, and more particularly to a displacement detection apparatus which irradiates a light beam from a light source onto an object and detects incident position information on a predetermined plane of a reflected light beam from the object to determine displacement information (absolute position information) of the object from a predetermined position.

2. Related Background Art

Various displacement detection apparatuses which can photoelectrically detect displacement amount or displacement information from a predetermined position of an object by utilizing a light have been proposed.

FIG. 1 shows a schematic diagram of a prior art laser displacement apparatus which utilizes a laser beam.

In FIG. 1, a light beam 83 from a semiconductor laser 82 driven by a semiconductor laser drive circuit 81 is condensed by a projection lens 84 and projected so as to form a light spot on an object 85. A reflected light beam from the object is directed onto a light position detector 87 of such as a position sensor by a condense lens (receiving lens) 86.

When the object is displaced from a reference position C to a position $A_1$ or a position $B_1$, an incident position of the reflected light beam to the light position detector 87 changes to a point A' or a point B'. A displacement amount or a displacement information from a predetermined position of the object 85 is detected by using a signal from the light position detector 87.

In the prior art displacement detection apparatus, the light source portion, the projection lens and the light position detector and the like are independently arranged in a housing.

As a result, there have been problems that the number of parts increases, the assembly adjustment of the elements and the position adjustment among the elements are difficult to attain, and the overall size of the apparatus increases.

SUMMARY OF THE INVENTION

It is an object of the present invention to provide a displacement detection apparatus which highly precisely determines displacement amount or displacement information from a predetermined position of an object through a simple construction.

Other objects of the present invention will be apparent from the following detailed description of the preferred embodiments of the present invention.

BRIEF DESCRIPTION OF THE DRAWINGS

FIG. 6 shows a schematic diagram of a main part of a third embodiment of the present invention;

DETAILED DESCRIPTION OF THE PREFERRED EMBODIMENTS

In accordance with embodiments of the present invention described below, a displacement detection apparatus comprises a light source, an optical member for emitting a light beam from the light source as a linear light beam, a reflection mirror for reflecting the linear light beam from the optical member toward an object, and a detecting portion for detecting an incident position of the reflected light from the object onto a predetermined plane. Those elements are arranged on a single substrate and displacement information of the object is determined by using an output signal from the detector.

In accordance with one of above embodiments the optical member has a light condensing function toward a single direction and a diverging function in a direction transverse to the single direction, the detector comprises a plurality of light receiving portion arranged symmetrically in relation to a line connecting a center of the light source and a center of the optical member, the light source comprises a double-side emission type semiconductor laser, and the optical member and the mirror are arranged on the respective emission side of the light beam from the light source.

Figure 1:
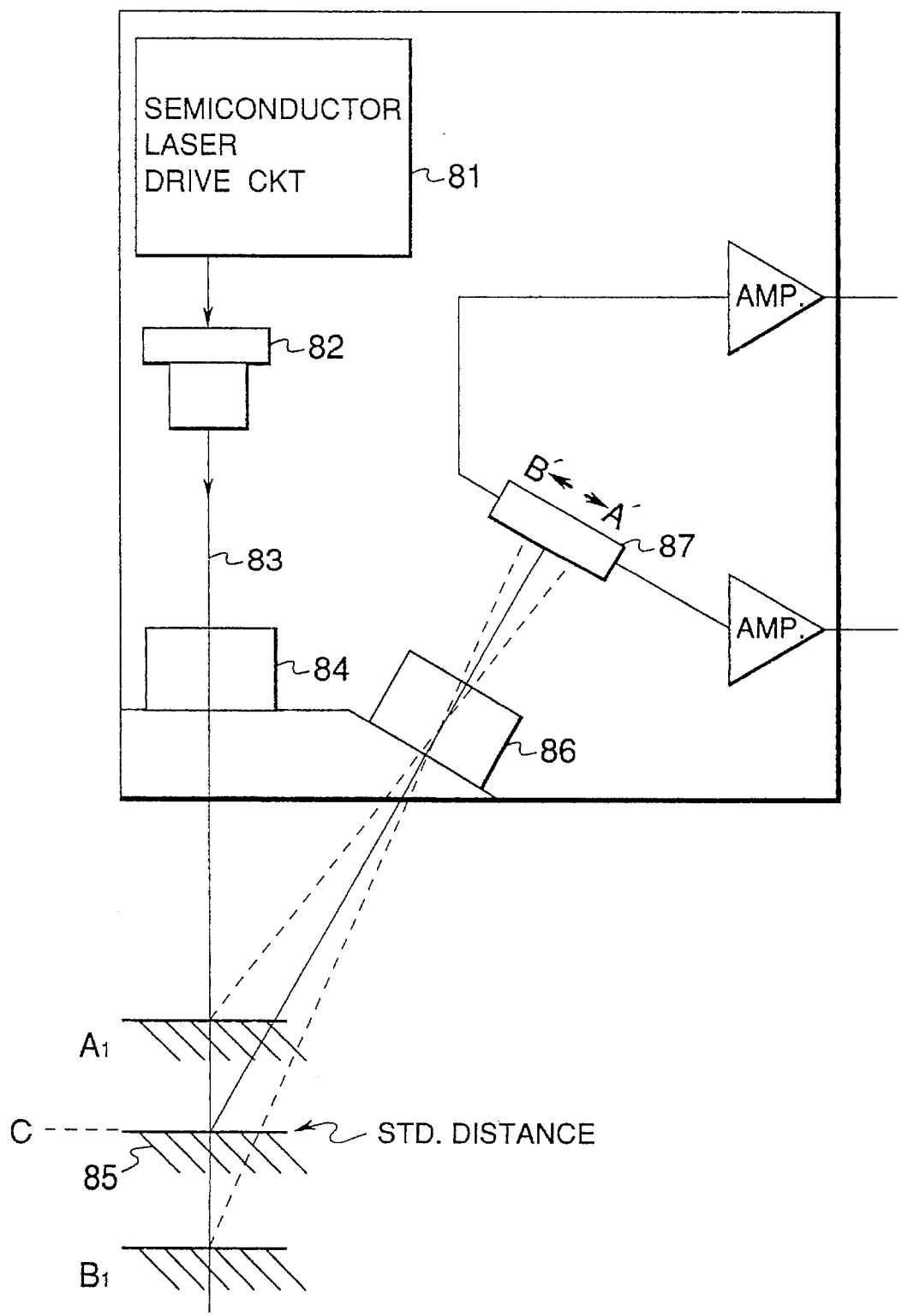
FIG. 1 shows a schematic diagram of a prior art laser displacement apparatus.
Figure 2:
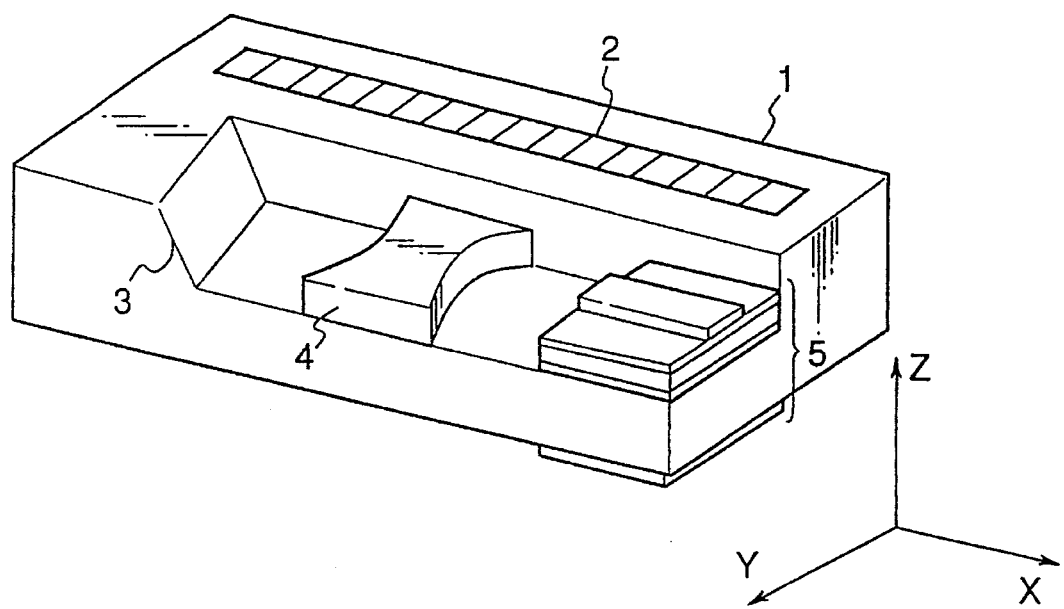
FIG. 2 shows a perspective view of a main part of a first embodiment of the present invention.
Figure 3A:
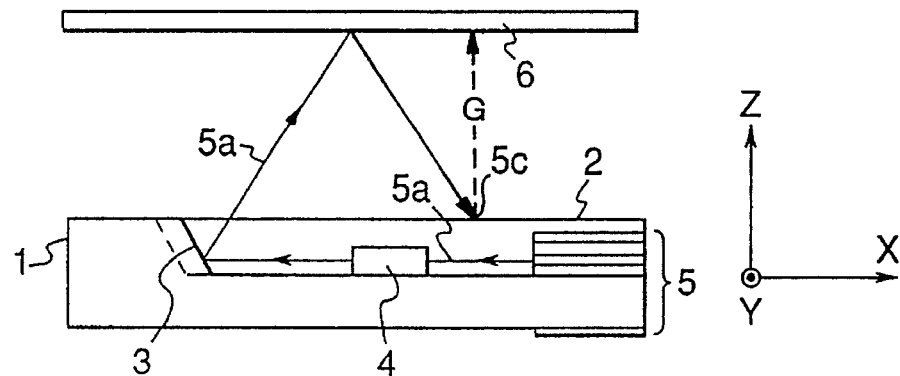
FIGS. 3A and 3B show schematic diagrams when viewed from one direction of FIG. 2.
Figure 3B:
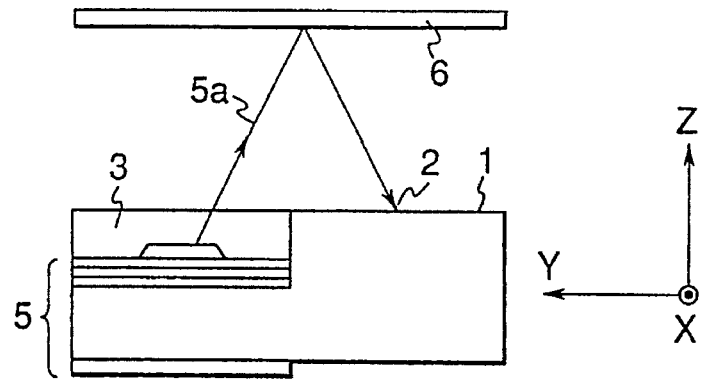

FIG. 2 shows a schematic diagram of a main part of a first embodiment of the present invention, and FIGS. 3A and 3B show schematic diagrams of the main part when viewed from a Y direction and an X direction, respectively.

In FIG. 2, numeral 1 denotes a substrate such as silicon, numeral 2 denotes a detector comprising a CCD line sensor arranged on the substrate 1, and numeral 5 denotes a light source comprising a semiconductor laser and which emits a diverging light beam 5a.

Numeral 4 denotes an optical member which has a light condensing function in a Z direction and a diverging function in a Y direction and which emits the light beam 5a from the light source 5 as an elongated linear light beam along the Y axis. Numeral 3 denotes a mirror which reflects the light beam 5a from the optical member 4 and obliquely directs a spot light to an object 6 at a predetermined angle. In the present embodiment, the elements 2, 3, 4 and 5 are integrally arranged on the substrate 1. For example, the detector 2 may be arranged at a position adjacent to the light source 5 and the mirror 3 substantially normal to the direction from the light source 5 to the mirror 3.

In the present embodiment, the measurement of a distance between the substrate 1 and the object 6 is explained.

The diverging light 5a from the light source 5 is reflected by the mirror 3 and directed to the object 6 as the elongated linear light beam along the Y axis through the optical member 4. The reflected light beam from the object 6 is directed to the detector 2 arranged on the substrate 1. The detector 2 detects a center of light quantity gravity of the incident light beam to determine a position coordinate of the incident position 5c on the plane of the CCD line sensor. The mirror 3 is inclined in an XY plane so that a normal reflected light from the object 6 is efficiently incident onto the CCD line sensor 2. Since the light beam is linear, the light beam is not moved apart from the CCD line sensor 2 even if the object 6 is moved in the Z direction.

In the present embodiment, it is designed such that the light beam is directed to a predetermined position on the CCD line sensor 2 when a distance between the object 6 and the substrate 1 (CCD line sensor 2) is set to be a predetermined value. When the object 6 is displaced towards the Z axis without inclination, the light beam is displaced accordingly along the X axis on the CCD line sensor 2. Thus, the X axis coordinate on the CCD line sensor 2 is determined to determine the distance between the object 6 and the substrate 1 by an unshown arithmetic operation circuit.

The features of the elements arranged on the substrate in the present embodiment are now explained.

Figure 4:
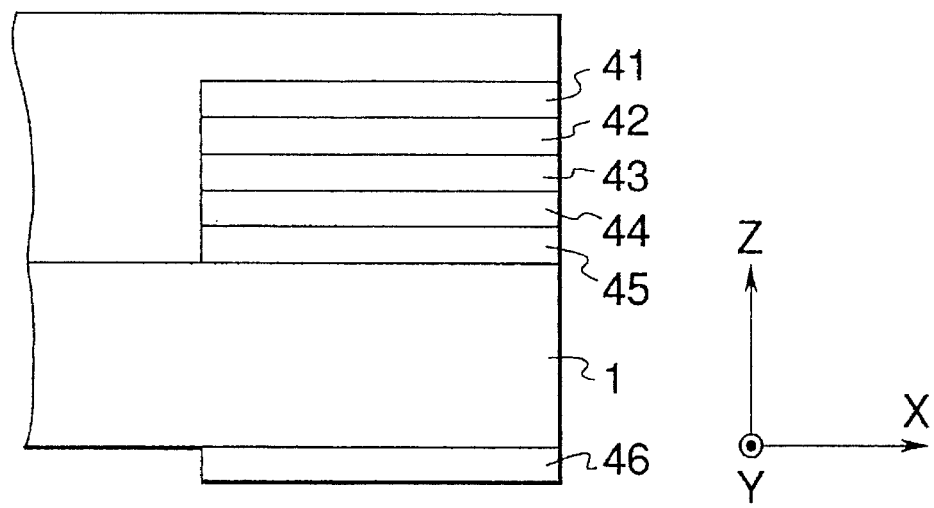
FIG. 4 shows a schematic diagram of a portion of FIG. 2.

FIG. 4 shows a schematic diagram of a main part of the semiconductor laser of the light source 5 of FIG. 2.

In FIG. 4, numeral 1 denotes a substrate made of silicon, numeral 45 denotes a Ga—As layer which serves as a substrate of the semiconductor laser, numeral 44 denotes an Al—Ga—As layer which serves as a first clad layer, numeral 43 denotes a Ga—As layer which serves as an activation layer, numeral 42 denotes an Al—Ga—As layer which serves as a second clad layer, numeral 41 denotes an upper electrode and numeral 46 denotes a lower electrode.

Those elements are formed on the same substrate 1 as that of the detector 2 by metal organic vapor phase epitaxy (MOVPE) method.

The light beam emitted from the semiconductor laser 5 has a sectional shape which is narrow in the Z direction and wide in the Y direction immediately after the emission (in a near field pattern) and the spread in the Z direction increases in a far field pattern.

The optical member 4 reduces a beam diameter of the light beam in the Z direction and expands it in the Y direction to form a sheet-shaped light beam (linear light beam). To this end, a refractive index is increased as it goes toward the center to provide a light condensing function in the Z direction and it has a shape of a concave lens so as to provide a diverging function in the Y direction.

A construction of the optical member 4 and a method for manufacturing the same are now explained.

First, $SiO_2$ which is a material of the optical member 4 is deposited on the substrate by a sputtering method. SiON which has a large refractive index is mixed therewith to adjust the refractive index. Initially, $SiO_2$ having a smaller refractive index is deposited and a proportion of SiON having a larger refractive index is gradually increased. The refractive index is rendered maximum at the center of the optical member and then $SiO_2$ is gradually increased to reduce the refractive index. Finally, it is formed into concave lens shape by ion beam etching. In this manner, the condensing function is provided in the Z direction and the diverging function is done in the Y direction.

The optical member 4 may be made of an anamorphic system having different refractive indices in the Z direction and the Y direction.

The reflection mirror 3 deflects the light beam shaped by the optical member 4 toward the object 6. Major functions of the reflection mirror 3 are a function to deflect the light beam along a light path shown in FIG. 3A in the X-Z plane and a function to deflect it in the Y-Z plane as shown in FIG. 3B. The latter is a function to efficiently lead the light beam to the detector 2. It is not always necessary to deflect the light beam if an axis connecting the center of the light source and the center of the optical member 4 and the axis of the CCD line sensor 2 are sufficiently close to each other or the light beam has a sufficient spread in the Y direction.

In order to form the reflection mirror 3 on the substrate 1, the substrate 1 is first obliquely etched. It may be done by a reactive ion beam etching (RIBE) method. The obliquely shaping method of the substrate 1 may be done by utilizing the fact that the etching rates are different by the plane orientation of the substrate 1, but a setting angle of the plane is uniquely determined by the plane orientation of the silicon wafer. Therefore, it is convenient to use a RIBE method which permits free setting of the plane angle.

An opening is formed in the mask member which is not infinitive to the etching such as resist, the Si substrate is set by a desired angle (so that the plane angle is determined) and it is etched by the reactive ion etching.

Al and Ag and the like are formed on the reflection plane by a vacuum deposition method to form a metallic reflection plane.

The light beam deflected by the reflection mirror 3 is obliquely directed to the object 6 at a predetermined angle and it is normally reflected thereby and directed to the detector 2. If the object 6 is set parallel to a photosensing plane of the detector 2 and the surface roughness is small, a gap G between the detector 2 and the object 6 directly corresponds to the incident position X (shown in FIG. 3A as element 5c) of the light spot on the detector 2.

In the present embodiment, the gap G is measured by the incident position X. By forming the linear light beam (sheet-shaped beam) by the optical member 4, the position detection sensitivity on the detector 2 is improved by the convergence of the light beam in the X direction, the light beam is not moved off the detector 2 by the expansion of the light beam in the Y direction even if the object 6 has a rotational component around the X axis, and a setting tolerance of the plane angle of the reflection mirror 3 is increased.

Figure 5:
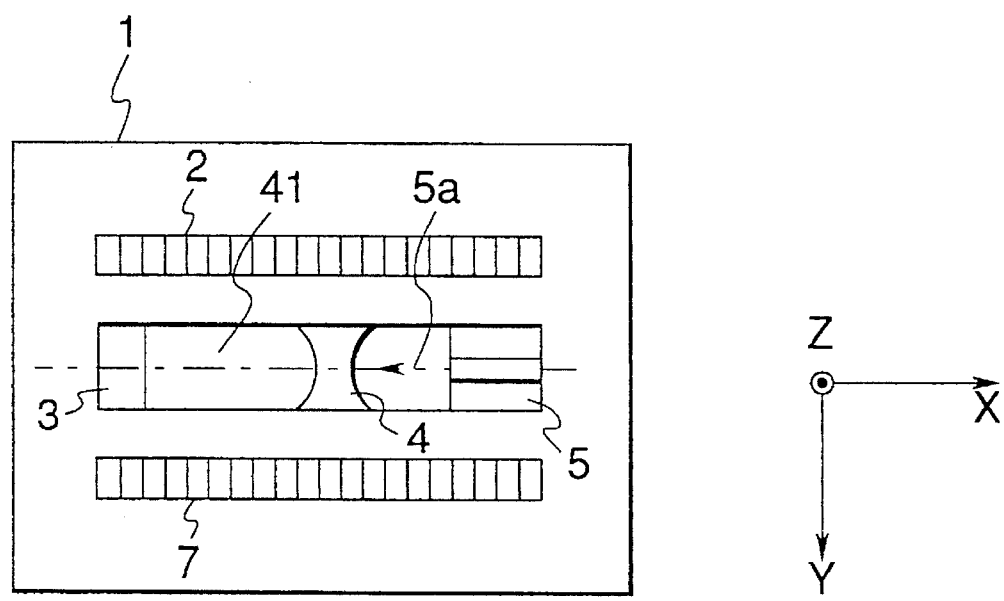
FIG. 5 shows a schematic diagram of a main part of a second embodiment of the present invention.

FIGS. 5 and 6 show schematic diagrams of second and third embodiments of the present invention, respectively. The like elements in FIGS. 5 and 6 to those of FIG. 2 are designated by the like numerals.

The second embodiment of FIG. 5 is different from the first embodiment in that a CCD line sensor 7 is arranged symmetrically to the CCD line sensor. 2 around an axis (optical axis) 41 connecting the center of the light source 5 and the center of the optical member 4, and the mirror 3 is inclined in the X-Y plane. Other construction is the same as that of the first embodiment.

In the present embodiment, the light beam 5a from the light source 5 is formed as a linear light beam by the optical member 4 and reflected in the X-Z plane by the reflection mirror 3 but because of the spread in the Y direction, the light beam after the reflection by the object (not shown) has the opposite ends thereof directed to the CCD line sensors 2 and 7, respectively. In the present embodiment, the intensities (accumulated light intensities) of the light beams being incident on the CCD line sensors 2 and 7 are compared to detect a rotational component Wx of the object. Namely, when the object 6 is rotated around the X axis, the intensity of the sensor facing the object increases, and the intensity of the other sensor decreases. Since the difference or ratio between the intensities corresponds to the rotational component Wx to some extent, Wx can be determined by the comparison therebetween.

In the third embodiment of FIG. 6, two light beams 5a and 5b are used as exit end planes of the light beam by using both sides of the semiconductor laser 5 as the light source. An optical member 8 and a reflection mirror 9 are further provided to construct an optical system which is symmetric relating to the Y axis.

Since two light beams are emitted from the semiconductor laser 5, two beams 5a and 5b are directed to each of the CCD line sensors 2 and 7, which is different from the embodiment of FIG. 5.

Figure 7A:
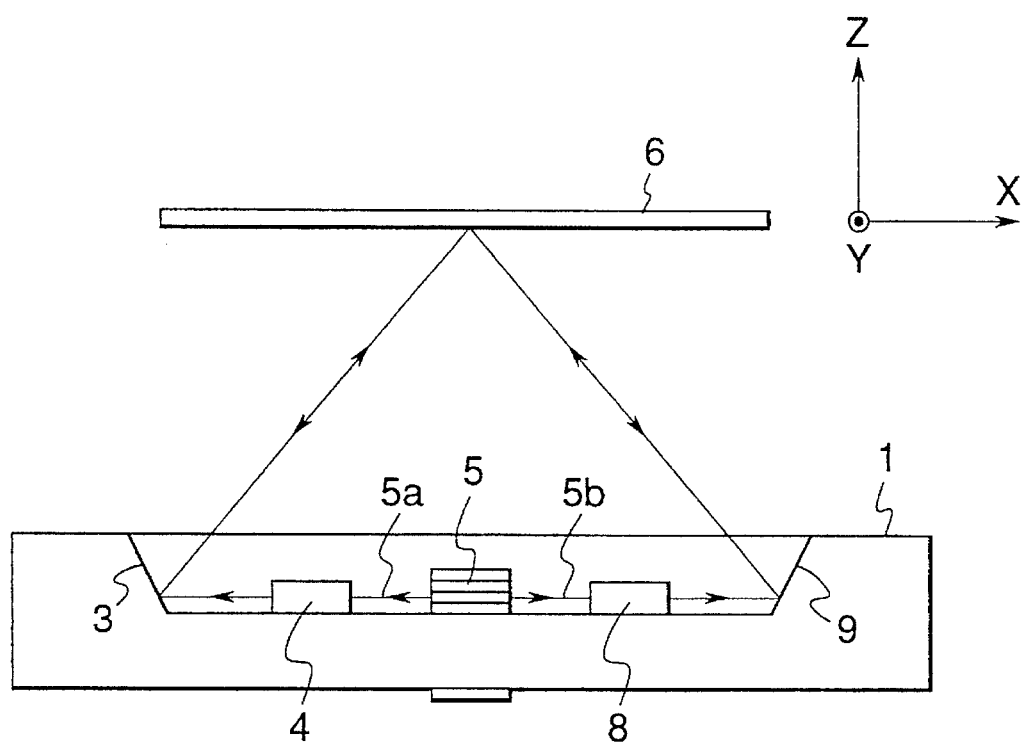
FIGS. 7A and 7B show schematic diagrams when viewed from one direction in FIG. 6.
Figure 7B:
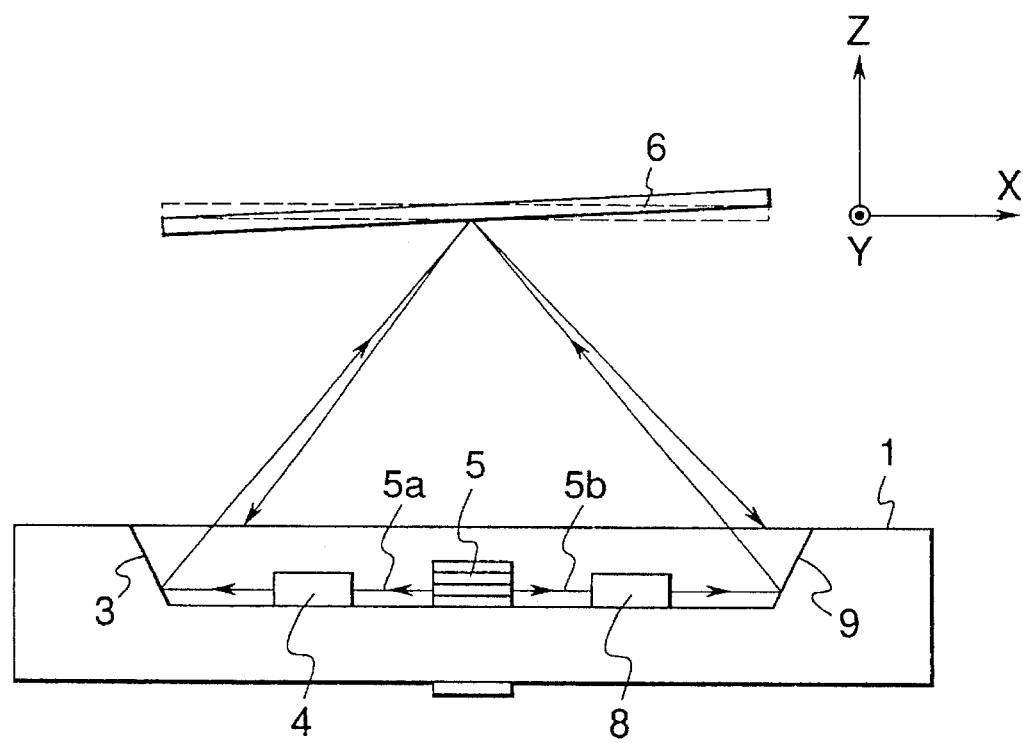

FIGS. 7A and 7B show sectional views of a main part of the present embodiment when the substrate 1 and the object 6 are substantially parallel to each other and slightly inclined in the X direction, respectively.

Figure 8A:
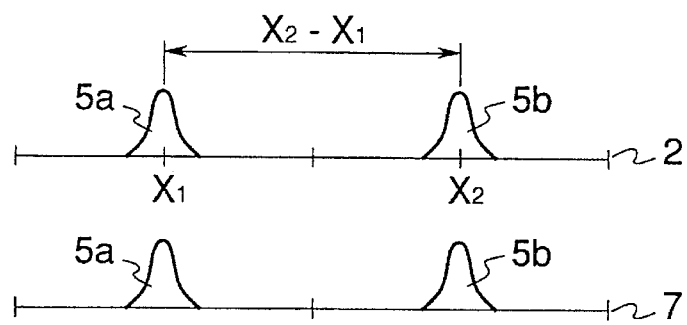
FIGS. 8A, 8B and 8C show output signals from a detector of FIG. 6.
Figure 8B:
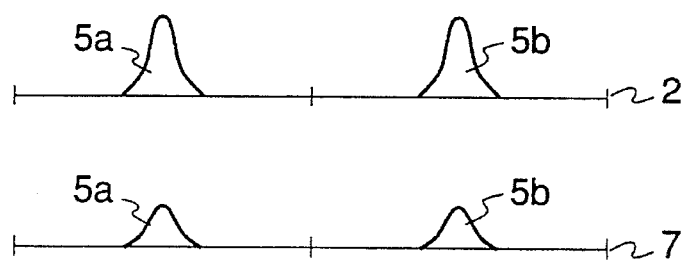
Figure 8C:
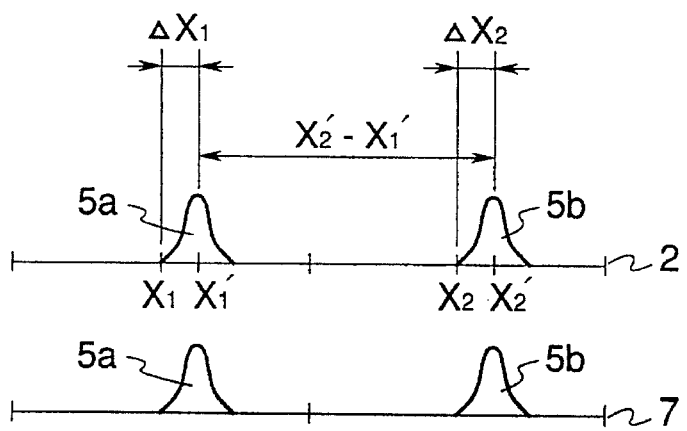

FIGS. 8A, 8B and 8C show conceptual views of intensity distribution when the two light beams are directed to the CCD line sensors 2 and 7 in the present embodiment. FIG. 8A shows an intensity distribution of the light beams on the planes of the CCD line sensors 2 and 7 when the object 6 and the substrate 1 are substantially parallel.

In the present embodiment, a relationship between a gap G between the substrate 1 and the object 6 and the incident positions of the two beams on planes of the CCD line sensors 2 and 7, that is, a relation between the distance between the two light beams and the spot interval is previously determined.

The incident positions $X_1$ and $X_2$ of the two light beams on the CCD line sensors 2 and 7 are detected, the spot interval $X_2-X_1$ is determined, and the gap between the substrate 1 and the object 6 is determined by an arithmetic operation circuit, not shown, based on the above.

FIG. 7B shows a light path of the light beam when the substrate 1 and the object 6 are slightly inclined from a parallel position shown by a broken line in a direction Wy as shown by a solid line.

FIG. 8B shows an intensity distribution when the object 6 has a rotational component Wx and the two light beams are incident on the CCD line sensors 2 and 7.

In the present embodiment, a ratio of total light intensities of the two CCD line sensors 2 and 7 is calculated to determine the rotational component Wx around the X direction.

Even if object 6 has the rotational component Wx, the incident positions of the two light beams on the CCD line sensors 2 and 7 are fixed and there is no detection error in the distance of the two light beams (spot interval) $X_2-X_1$, so that a high precision detection is attained.

FIG. 8C shows a displacement (shift) of the incident positions $X_1$ and $X_2$ of the two light beams on the CCD line sensors 2 and 7 to incident positions $X_1'$ and $X_2'$ when the object 6 has a rotational component Wy in the Y direction as shown in FIG. 7B.

As shown, the displacements (shifts) $\Delta X1$ and $\Delta X2$ are substantially same.

As shown in FIG. 8C, the spot interval $X_2'-X_1'$ is substantially equal to the spot interval $X_2-X_1$ in the absence of the rotational component Wy so that the gap G can be measured independently from the rotational component Wy. The rotation amount Wy can also be determined from an average displacement of the spot $(\Delta X1+\Delta X2)/2$. This is calculated by the arithmetic operation circuit, not shown.

In the present embodiment, the sheet-shaped beam shaped by the optical member is used to measure the gap between the substrate 1 and the object 6 so that the gap G can be stably measured in spite of the error during fabricating the detector and the setting error of the object and the gap G and the rotational components Wx and Wy can be simultaneously measured by one beam generated by one light source.

In accordance with the present invention, the light source, the optical member for condensing the light beam from the light source and the mirror are appropriately arranged to attain the displacement detection apparatus which can highly precisely determine the displacement amount or the displacement information from the predetermined position of the object with a simple construction.

More specifically, the light source, the reflection mirror and the detector are arranged on a single substrate and the optical member is formed between the light source and the reflection mirror to stably measure the inclination of the object, and the displacement detection apparatus is compact and does not require alignment among the parts.

What is claimed is:

1. An apparatus for detecting a displacement of an object, comprising:

a light source element for emitting a detection light beam;

a reflection member for reflecting the detection light beam from said light source element, the detection light beam being irradiated onto said object by the reflection from said reflection member;

a photo-sensing element for receiving the detection light beam reflected from said object by a photo-sensing surface thereof to detect an incident position of the detection light beam on said photo-sensing element, wherein displacement information of said object is determined in accordance with the detection by said photo-sensing element;

a substrate having said light source element, said reflection member and said photo-sensing element being arranged thereon; and an optical member for directing the detection light beam from said light source element toward said reflection member, said optical member also being arranged on said substrate, wherein said light source element, said optical member and said reflection member are formed on said substrate.

2. An apparatus for detecting a displacement of an object according to claim 1 wherein said optical member has a light condensing function in one direction and a light diverging function in a direction normal to the one direction.

3. An apparatus for detecting a displacement of an object according to claim 1 wherein said light source element emits the detection light beam substantially parallel onto said substrate, and said optical member is arranged to form the detection light beam into a linear light beam substantially parallel to said substrate.

4. An apparatus for detecting a displacement of an object according to claim 1 wherein said photo-sensing element is arranged at a position adjacent to said light source element and said reflection member substantially normal to the direction from said light source element to said reflection member.

5. An apparatus for detecting a displacement of an object according to claim 1 wherein said photo-sensing element is a one-dimension CCD arranged substantially parallel to the direction from said light source element to said reflection element.

6. An apparatus for detecting a displacement of an object according to claim 1 wherein said light source element includes a semiconductor laser.

7. An apparatus for detecting a displacement of an object according to claim 1 wherein said substrate includes a silicon substrate.

8. An apparatus for detecting a displacement of an object according to claim 7 wherein said light source element includes a semiconductor laser formed on said silicon substrate by an epitaxy method.

9. An apparatus for detecting a displacement of an object according to claim 7 wherein said optical member is formed by deposition on said silicon substrate.

10. An apparatus for detecting a displacement of an object according to claim 7 wherein said optical member is formed by etching on said silicon substrate.

11. An apparatus for detecting a displacement of an object according to claim 7 wherein said reflection member is formed by a vapor deposition method on said silicon substrate.

12. An apparatus for detecting a displacement of an object, comprising:

a light source element for emitting a detection light beam;

a reflection member for reflecting the detection light beam from said light source element;

the detection light beam being irradiated onto said object by the reflection by said reflection member;

a first photo-sensing element for receiving the detection light beam reflected from said object by a photo-sensing surface thereof to detect an incident position of the detection light beam on said photo-sensing element, wherein displacement information of said object is determined in accordance with the detection by said first photo-sensing element;

a substrate having said light source element, said reflection member and said first photo-sensing element being arranged thereon;

an optical member for directing the detection light beam from said light source element toward said reflection member as a linear light beam, said optical member also being arranged on said substrate; and a second photo-sensing element arranged symmetrically to said first photo-sensing element around a line connecting a center of said light source element and a center of said optical member, wherein linear displacement information of said object is determined based on the incident positions of the detection light beams on the photo-sensing planes of said first photo-sensing element and said second photo-sensing element and rotational displacement information is determined based on a comparison of intensities of the detection light beams on the photo-sensing planes of said first photo-sensing element and said second photo-sensing element.

13. An apparatus for detecting a displacement of an object, comprising:

a light source element for emitting a first detection light beam and a second detection light beam;

a first reflection member for reflecting the first detection light beam from said light source element;

the first detection light beam being irradiated onto said object by the reflection by said first reflection member;

a photo-sensing element for receiving the first detection light beam reflected from said object by a photo-sensing surface thereof to detect an incident position of the first detection light beam on said photo-sensing element, wherein displacement information of said object is determined in accordance with the detection by said photo-sensing element;

a substrate having said light source element, said first reflection member and said photo-sensing element being arranged thereon;

a first optical member for directing the first detection light beam from said light source element toward said reflection member as a linear light beam, said first optical member also being arranged on said substrate;

a second optical member for forming the second light detection light beam as a linear light beam; and a second reflection member for reflecting the second detection light beam formed into the linear light beam to irradiate the same onto said object, said second optical member and said second reflection member being arranged at a second detection light beam travel position on said substrate, wherein said photo-sensing element senses the second detection light beam reflected from said object by a photo-sensing plane thereof, and the displacement information and rotational information of said object is determined from a positional relationship of the first detection light beam and the second detection light beam on the photo-sensing plane.

14. An apparatus for detecting a displacement of an object, comprising:

a light beam irradiating system for irradiating a detection light beam onto an object;

first and second light beam position detecting elements for receiving said detection light beam reflected from said object at positions which are substantially mutually symmetric with respect to said light beam irradiating system; and a substrate, said light beam irradiating system and said first and second light beam position detecting elements being provided on said substrate, wherein relative linear displacement information of said object is determined based on incident positions of said detection light beam on each of light-receiving surfaces of said first and second light beam position detecting elements, and wherein relative rotational displacement information of said object is determined based on a comparison of mutual intensities of said detection light beams on each of light-receiving surfaces of said first and second light beam position detecting elements.

15. An apparatus according to claim 14, wherein a gap between said object and said apparatus is determined based on an incident position of said detection light beam on each of said light-receiving surfaces in a direction normal to a direction in which said first and second light beam position detecting elements are disposed, and wherein an inclination of said object in said direction in which said first and second light beam position detecting elements are disposed is determined based on a comparison of mutual intensities of said detection light beams on each of said light-receiving surfaces of said first and second light beam position detecting elements.

16. An apparatus according to claim 14, wherein said light beam irradiating system further irradiates a second detection light beam onto said object, wherein relative linear displacement information of said object is determined based on a difference between two incident positions of said detection light beam and said second light beam at each of said light-receiving surfaces of said first and second light beam position detecting elements, and wherein relative rotational displacement information of said object is determined based on a comparison of mutual intensities of light beams received on each of said light-receiving surfaces of said first and second light beam position detecting elements.

17. An apparatus for detecting a displacement of an object, comprising:
- a light emitting unit for emitting at least first and second detection light beams, said at least first and second detection light beams being irradiated onto said object;
- first and second photo-sensing elements for receiving said at least first and second detection light beams reflected from said object by each photo-sensing surface thereof to detect an incident position of each of said at least first and second detection light beams on said first and second photo-sensing elements;
- a substrate having said light emitting unit and said first and second photo-sensing elements being arranged thereon; and
- a processing circuit for determining linear displacement information of said object along an axis, wherein linear displacement information of said object along a first axis, rotational displacement information of said object around the first axis, and rotational displacement information of said object around a second axis perpendicular to the first axis, are determined in accordance with detection by said first and second photo-sensing elements.

18. An apparatus for detecting a displacement of an object, comprising:
- a light emitting unit for emitting at least one detection light beam, said at least one detection light beam being irradiated onto said object;
- first and second photo-sensing elements for receiving said at least one detection light beam reflected from said object by each photo-sensing surface thereof to detect an incident position of said at least one detection light beam on said first and second photo-sensing elements; and
- a substrate having said light emitting unit and said first and second photo-sensing elements being arranged thereon,
- a processing circuit for determining linear displacement information wherein linear displacement information of said object and rotational displacement information of said object around an axis are determined in accordance with the detection by said first and second photo-sensing elements.

* * * * *

UNITED STATES PATENT AND TRADEMARK OFFICE
CERTIFICATE OF CORRECTION

PATENT NO. : 5,523,844
DATED : June 4, 1996
INVENTOR(S) : Hasegawa et al.

It is certified that error appears in the above-indentified patent and that said Letters Patent is hereby corrected as shown below:

COLUMN 2:

Line 27, "portion" should read --portions--.

COLUMN 4:

Line 43, "sensor. 2" should read --sensor 2--.

COLUMN 8:

Line 34, "beam-on" should read --beam on--.

COLUMN 10:

Line 13, "and" should be deleted; and
    Line 16, "thereon," should read --thereon; and--.

Signed and Sealed this

First Day of October, 1996

Attest:

BRUCE LEHMAN

Attesting Officer    Commissioner of Patents and Trademarks